US010561952B2

United States Patent
Sutaria et al.

(10) Patent No.: US 10,561,952 B2
(45) Date of Patent: Feb. 18, 2020

(54) MANAGEMENT OF TURN-BASED SELECTION SYSTEMS

(71) Applicant: CBS Interactive Inc., San Francisco, CA (US)

(72) Inventors: Brijesh Sutaria, Parkland, FL (US); Ryan Collado, Ft. Lauderdale, FL (US); Louis Miller, Belvidere, NJ (US); Grant Gurtin, San Francisco, CA (US); Ray Solebello, Boca Raton, FL (US)

(73) Assignee: CBS Interactive Inc., New York, NY (US)

( * ) Notice: Subject to any disclaimer, the term of this patent is extended or adjusted under 35 U.S.C. 154(b) by 159 days.

(21) Appl. No.: 15/423,277

(22) Filed: Feb. 2, 2017

(65) Prior Publication Data

US 2018/0214778 A1    Aug. 2, 2018

(51) Int. Cl.
| A63F 13/828 | (2014.01) |
| A63F 13/35  | (2014.01) |
| A63F 13/537 | (2014.01) |
| A63F 13/79  | (2014.01) |

(52) U.S. Cl.
CPC ............ *A63F 13/828* (2014.09); *A63F 13/35* (2014.09); *A63F 13/537* (2014.09); *A63F 13/79* (2014.09)

(58) Field of Classification Search
CPC ...... A63F 13/828; A63F 13/35; A63F 13/537; A63F 13/79
See application file for complete search history.

(56) References Cited

U.S. PATENT DOCUMENTS

| 8,019,692 | B2* | 9/2011 | Rosen ........................... 705/319 |
| 2002/0183105 | A1* | 12/2002 | Cannon et al. ................. 463/16 |
| 2004/0132521 | A1* | 7/2004 | Peterson ........................ 463/16 |
| 2006/0058083 | A1* | 3/2006 | Crawford, III ...... A63F 3/00157 463/11 |
| 2006/0135264 | A1* | 6/2006 | Shaw et al. ..................... 463/42 |
| 2009/0291763 | A1* | 11/2009 | Guo ........................ G07F 17/32 463/42 |
| 2010/0160038 | A1* | 6/2010 | Youm et al. .................... 463/29 |
| 2011/0269546 | A1* | 11/2011 | Gill et al. ....................... 463/42 |

* cited by examiner

*Primary Examiner* — David L Lewis
*Assistant Examiner* — Matthew D Hoel

(57) ABSTRACT

A method, executed on a computing device, includes calculating a selection time period as a function of a time bank allotment for a user profile, a defined time for a selection, and a number of available selections; sending a notification to a client device indicating that the selection time period is initiated at a first time; receiving a selection from the client device at a second time; updating the time bank allotment according to a used time, the used time comprising an amount of time between the first time and the second time; decrementing the number of available selections; and updating the user profile with the received selection. Other embodiments are described and claimed.

18 Claims, 17 Drawing Sheets

User Interface 400

| CATEGORY | SETTING |
|---|---|
| # of Rounds | 10 |
| Time Bank | 6:00:00 |
| Max Pick Time | 5:45:00 |
| Min Pick Time | 5:00 |
| Draft Start (Day) | Wednesday |
| Draft End (Day) | Saturday |
| Draft Clock Active From | 11:00 AM ET |
| Draft Clock Active Until | 10:00 PM ET |

*FIG. 4*

MANAGEMENT OF TURN-BASED SELECTION SYSTEMS

BACKGROUND

Computing applications that involve participation of multiple users in a turn-based process may need to manage the amount of time allotted to each participating user to take a turn so that the other participants also have a fair and sufficient amount of time to take their turns. When the turn-based process involves sequential turn-taking and when each participant can take multiple turns, for example, in multiple turn cycles, the time management aspects become more complicated.

BRIEF DESCRIPTION OF THE DRAWINGS

FIG. 4 illustrates an embodiment of a first user interface.

DETAILED DESCRIPTION

Figure 1:
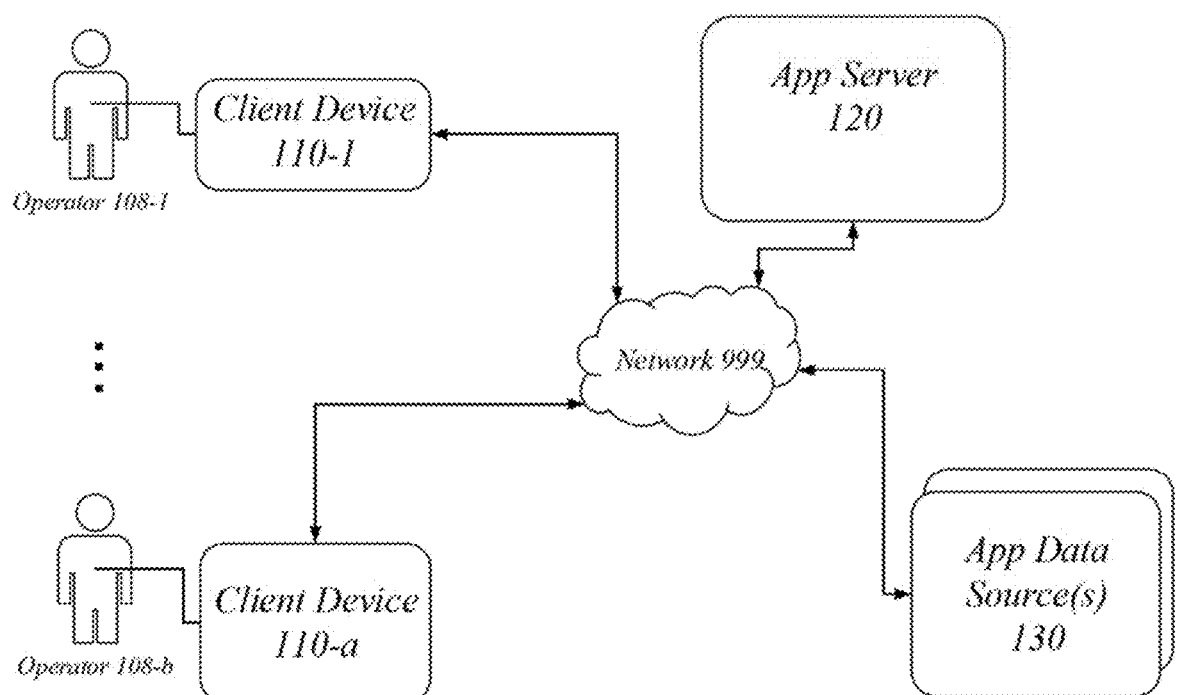
FIG. 1 illustrates an embodiment of a turn-based selection system.

Various embodiments are generally directed to management of a turn-based selection system. Various embodiments are more specifically directed to managing the time allotted to each participant in a turn-based selection system to make one or more selections.

An example embodiment that could make use of the turn-based selection systems described herein includes a fantasy game. The fantasy game may allow a group of operators, also referred to here as participants or users, to take turns selecting from a fixed pool of real-world choices, e.g. a set of professional football players, to add to their individual rosters for a round of play. In an embodiment, a new round of the fantasy game may begin each week, and the participants may change their rosters with each new round. Each round may include a plurality of choices for each participant, e.g. a turn for each slot in a roster. Once a real-world choice has been selected from the pool, that choice becomes unavailable to the other participants for the rest of that round. When all of the selections for a round have been made, a score and/or ranking may be determined based on the performance of the real-world choices in the real-world events, e.g. the football games of that week.

In an embodiment where eight participants form a league to play against each other, and where each roster includes, for example, six slots, a total of 8×6=48 selections must be made within the time period allotted for the round. Each participant (except the first participant in the turn order) must wait until the previous participant has made their selection before being allowed to make a selection. If a new round begins each week, for example, then there is a maximum of 7 days×24 hours in which selections can be made. In practice, a maximum time for selections may be reduced by one or more days in order to close the drafting process before the real-world events begin, and/or to give the players some time to consider their upcoming selections before a new round of drafting begins. Therefore, total time available to the plurality of users to make selections may be, for example, 4 days×24 hours, or 3 days×12 hours. In order to prevent one participant from using all of the total time available for a turn, and thus preventing the other participants from having a fair amount of time to take their turns, embodiments provide a time-management operations for turn-based selection systems.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or system for performing these operations. This apparatus may be specially constructed for the specified purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct a more specialized apparatus to perform the required method steps. The structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100 that provides turn-based selection. In one embodiment, the system 100 may comprise a computer-implemented system 100 having various elements, such as a client devices 110-1 through 110-a, where a represents a positive integer, an app server 120, and one or more app data sources 130. The elements may be communicatively coupled via a one or more networks, such as network 999. Although the system 100 shown in FIG. 1 has a limited number of elements in a certain topology, it may be appreciated that the system 100 may include more or fewer elements in alternate topologies as desired for a given implementation.

The system 100 may include an app server 120. App server 120 may comprise one or more electronic devices capable of receiving, processing, and sending information for the system 100. Examples of an electronic device may include, without limitation, an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

App server 120 may include software and/or hardware that operates to provide turn-based operations in communication with the client devices 110. App server 210 may perform some or all of the operations and may send or provide information to a client component executing on the client devices 110 to enable the presentation of user interface elements on the client devices 110. App server 120 may receive user input from the client devices 110 that updates or modifies a state of the turn-based process. App server 120 may provide data about the available operations for a turn, e.g. which choices are still available for selection; data about other participants in the process, e.g. what choices the other participants made; rankings; scores; timing information; turn order information; and so forth. Embodiments and operations of app server 120 are discussed below with respect to FIG. 3.

App data sources 130 may include data feeds, databases, or any other source of data accessible to and used by app server 120. App data sources 130 may provide data used by the app server 120 to rank users of a client application with respect to one another. App data sources 130 may include raw data, e.g. measurements, counts, scores, and/or analyzed data, e.g. averages, means, or other statistics.

In an embodiment, app server 120 and app data sources 130 may be owned and/or under the control of the same content provider entity, such as CBS INTERACTIVE INC., San Francisco, Calif. In other embodiments, app server 120 and app data sources 130 may be owned and/or under the control of separate entities.

The system 100 may comprise a client device 110. A client device, e.g. client device 110-1, may be usable by an operator, e.g. operator 108-1, to view app data and interact with other operators 108 of other client devices 110, for example in a turn-based game. Client device 110 may include any electronic device as described above. A client device 110 may also be able to receive and present app data, including text, images, video or audio streaming data, in a user interface on the client device 110.

Figure 2:
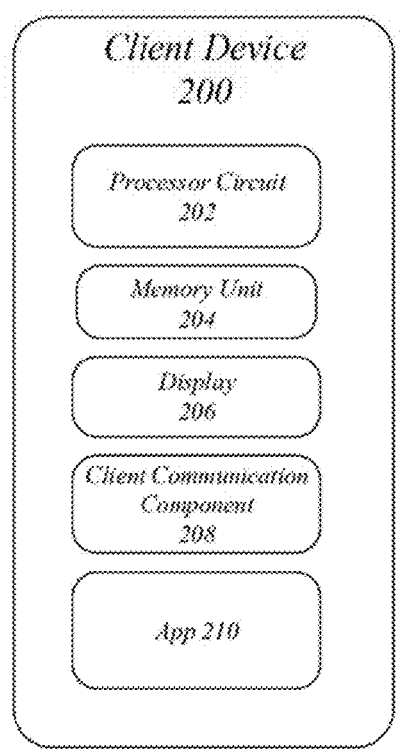
FIG. 2 illustrates an embodiment of a client device.

FIG. 2 illustrates an embodiment of a client device 200. Client device 200 may be a representative example of a client device 110. Client device 200 may execute processing operations or logic using a processor circuit 202. Processor circuit 202 may comprise various hardware elements. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

Client device 200 may include one or more memory units 204. A memory unit 204 may include various computer-readable storage devices, volatile and non-volatile, that store data and instructions for retrieval by processor circuit 202. As used herein, a memory unit 204 does not include signals or carrier waves, such as electromagnetic or optical waves. Memory units are described further with respect to FIG. 16.

Client device 200 may include a display 206. Display 206 may be integrated into client device 200, or may be separate but communicatively coupled to client device 200. Display 206 may include a touch-sensitive surface that can detect a touch gesture or a proximity gesture, which may include contact with, or proximity to, items such as a human fingertip, a stylus, an electronic pen, and so forth. Display 206 may also include conventional computer monitors or integrated laptop computer screens.

Client 200 may include a client communication component 208. Client communication component 208 may include hardware and/or software capable of connecting communicatively to another device, e.g. app server 120, and communicating electronic data across the connection. In an embodiment, for example, client communication component 208 may request a web page or user interface elements from app server 120 for presentation and interaction on the client device 200. The embodiments are not limited to these examples.

Client 200 may include an application ("app") 210. The app 210 may include functions that allow an operator, e.g. operator 108-b, to open a connection with the app server 120. The app 210 may request or receive data to present in a user interface on display 206, and provide interactive user interface elements within the user interface. In an embodiment, the app 210 may be a stand-alone application executing on processor circuit 202. In another embodiment, the app 210 may be presented in a web browser application executing on processor circuit 202 in communication with the app server 120.

In an embodiment, the app 210 may be the client component of a client-server application that presents a turn-based process. In some embodiments, the turn-based process may be a game or a fantasy game. The app 210 may present user interfaces that allow the operator to select a fantasy team, view rankings and scores, and interact with other players of the fantasy game. In another embodiment, the app 210 may be a collaboration application that presents, at least in part, a set of choices that the collaborating operators may select in a turn-based process, for example, sub-tasks in a project, or pot-luck dishes for a co-hosted dinner party. The embodiments are not limited to these examples.

Figure 3:
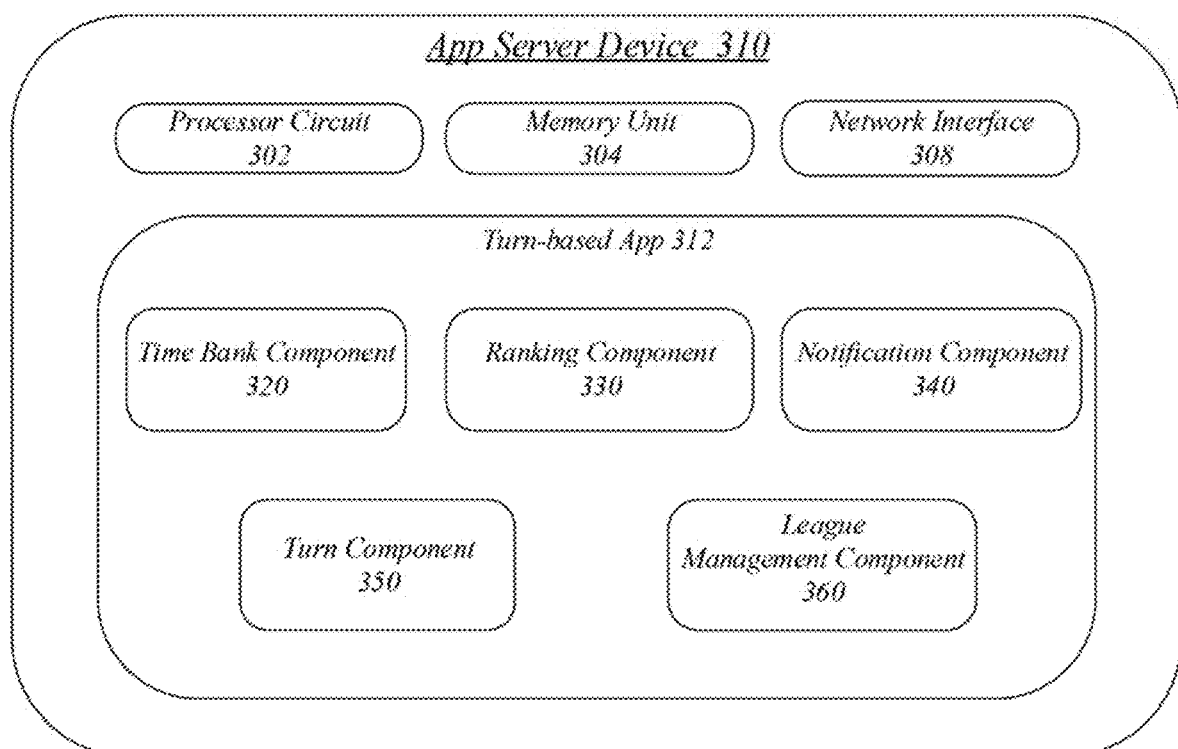
FIG. 3 illustrates an embodiment of an operating environment.

FIG. 3 illustrates an embodiment of an operating environment 300. Operating environment 300 may comprise an embodiment of an app server device 310. App server device 310 may be a representative example of the app server 120. App server device 310 may include a processor circuit 302 and a memory unit 304, which may be analogous to processor circuit 202 and memory unit 204. App server device 310 may include a network interface 308 which may include hardware and/or software to communicate information with clients 110 and the app data servers 130. Although depicted as a single entity, the app server device 310 may be embodied on one or more physical devices, which may be co-located or distributed in various locations.

The app server device 310 may include a turn-based app 312. The turn-based app 312 may be the server-side component of the app 210. The turn-based app 312 may communicate with the app 210 on a plurality of client devices 110, and may provide the operations and information for the functioning of a turn-based process as will be described.

The turn-based app 312 may include one or more functional elements that provide the operations described herein. The functional elements may be encoded in software and/or hardware instructions that are executed by the processor circuit 302 to perform the described operations. For example, the turn-based app 312 may include a time bank manager 320, a ranking component 330, a notification component 340, a turn component 350, and a league management component 360. More, fewer, or other functional elements may be used. In some embodiments, some of the functional elements may be combined into one functional element.

The time bank component 320 may be operative to calculate, for each user of a plurality of users in a group or league, an initial time bank allotment for a user. The initial time bank allotment may be calculated as a function of a number of the plurality of users and a total time available to the plurality of users to make selections during a round. For example, if there are six participants in a league, and a total time available is fifty two hours, then an initial time bank allotment for each of the players is 52/6=8.6 hours. The initial time bank allotment is the total amount of time that a participant has to take all of their turns in a round.

The time bank component 320 may calculate a selection time period for a turn of an individual user as a function of: a time bank allotment (TBA) for the individual user, a defined time (Tmin) for a selection or turn, and a number of available selections or turns (NT) remaining to be made by the individual user. NT may include the current turn in the number of available turns remaining.

$$\text{Selection Time Period} = \frac{(TBA - (NT * Tmin))}{NT} \quad (1)$$

Equation (1) is an example of how the selection time period for a turn may be calculated. In the example above, a user's initial time bank allotment may be 8.6 hours, and there may be eight turns per player in the round. A defined time of five minutes may be reserved for each turn. Accordingly, if equation (1) is used, the selection time period=(8.6−0.6)/8=1 hour. The user would have up to one hour to take their turn.

In another embodiment, the selection time period may be calculated according to:

$$\text{Selection Time Period} = (TBA - (NT * Tmin)) \quad (2)$$

in equation (2), given the above example, the selection time period would be eight hours. If the user took the entire 8 hours for their first turn, the user would still have five minutes remaining for each of the remaining seven turns.

If the user completes a turn before the selection time period is elapsed, the time bank component 320 may update the time bank allotment for the user. For example, the time bank component 320 may subtract the amount of time used from the time bank allotment for the user. For example, if the beginning of the selection time period is a first time, and a selection is received (or the turn otherwise completed) from the user at a second time, the amount of time used comprises an amount of time between the first time and the second time. For example, if the user takes 40 minutes (0.6 hours) to complete a turn, with an initial time bank allotment of 8.6 hours, the user's updated TBA will be 8 hours.

The ranking component 330 may be operative to calculate or otherwise determine a score for each participant in a league, and may rank the participants according to the scores. The ranking component 330 may provide the ranking order to the league management component 360 and/or the turn component 350 for use in determining a turn order. Scores and/or ranking may determined according to any metric relating to the operations taken during the turn-based process. For example, in a fantasy game, the scores may be determined according to various metrics related to the real-world players' performances in the real-world events of that round. For task-related processes, scores may be determined according to speed or accuracy of task completion, grades or evaluations from superiors or peers, and so forth.

The notification component 340 may be operative to send notifications to the client devices 110 regarding various aspects of the turn-based process. For example, the notification component 340 may send a notification to a client device 110 indicating that a selection time period has begun for the individual user of the client device, when the individual user's turn begins. The notification component 340 may send a notification to a client device 110 when another user is taking a turn in the turn-based selection process. The notification component 340 may send a notification of a number of turns remaining before a next turn of the user. The notification component 340 may send a notification to the client device indicating that the user is next in the turn-based selection process. Other notifications may include information about the time remaining until the user's turn begins, messages from other users, ranking or scoring information, and so forth.

In some embodiments, a notification may include a link or trigger that causes the app 210 on the client device to open when the link or trigger is selected by the user. In some embodiments, the link or trigger may open the app 210 to the specific user interface relevant to the notification. For example, when the notification is that the user's turn has begun, selecting the notification may cause the app 210 to open directly into the interface where the user may take actions relating to a turn, such as making a selection.

The turn component 350 may be operative monitor the time remaining in a user's selection time period, and may, when enabled, take a user's turn for them. For example, the turn component 350 may determine that no selection or turn operation has been received from the user whose turn it is when the selection time period has expired or is about to expire. The turn component 350 may then take the user's turn.

When taking a turn comprises making a selection, the turn component 350 may be operative to make the selection from a set of choices associated with a user profile of the user. The user may have generated a set of choices from the pool of available selections for the participating group. The list may be ordered according to preference or priority, by categories of choices, or by other criteria. The turn component 350 may use the top of the list as the selection of the user.

In fantasy game applications, there may be restrictions on what selections may be made. For example, a roster may have slots reserved for a specific team position, e.g. two slots for football quarterbacks, two slots for running backs, and so forth. In this scenario, the choice at the top of the user's list may not be useable for the available slots. The turn component 350 may therefore search the user's list for a choice that may be used for the available slot.

If the user has not generated a list, or when none of the choices on the list are available, the turn component 350 may be operative to determine a set of available choices for the user's selection from the remaining pool of choices. The choices on the user's list might not be available because other users have already selected them, or because none of the user's remaining slots to fill correspond with the categories of choices on their list. The turn component 350 may therefore search the pool of remaining available choices for a selection that meets the criteria of a slot to be filled.

When more than one choice remains, the turn component 350 may retrieve statistical data about the remaining choices in the set of available choices, for example, from the app data sources 130. The turn component 350 may analyze the set of available choices according to the statistical data; and may select a best available choice of the available choices. The best available choice may be determined according to the relevant statistics for the slot being filled. For example, if an average number of points scored per game is a relevant statistic, then the choice having the highest average may be considered "best." If, as in golf scores, a lower number is considered better, then "best" may apply to the player having the lowest number in the relevant statistic. The relevant statistics may include other factors, such as a player's statistical deviations from a baseline. The embodiments are not limited to these examples.

Figure 7:
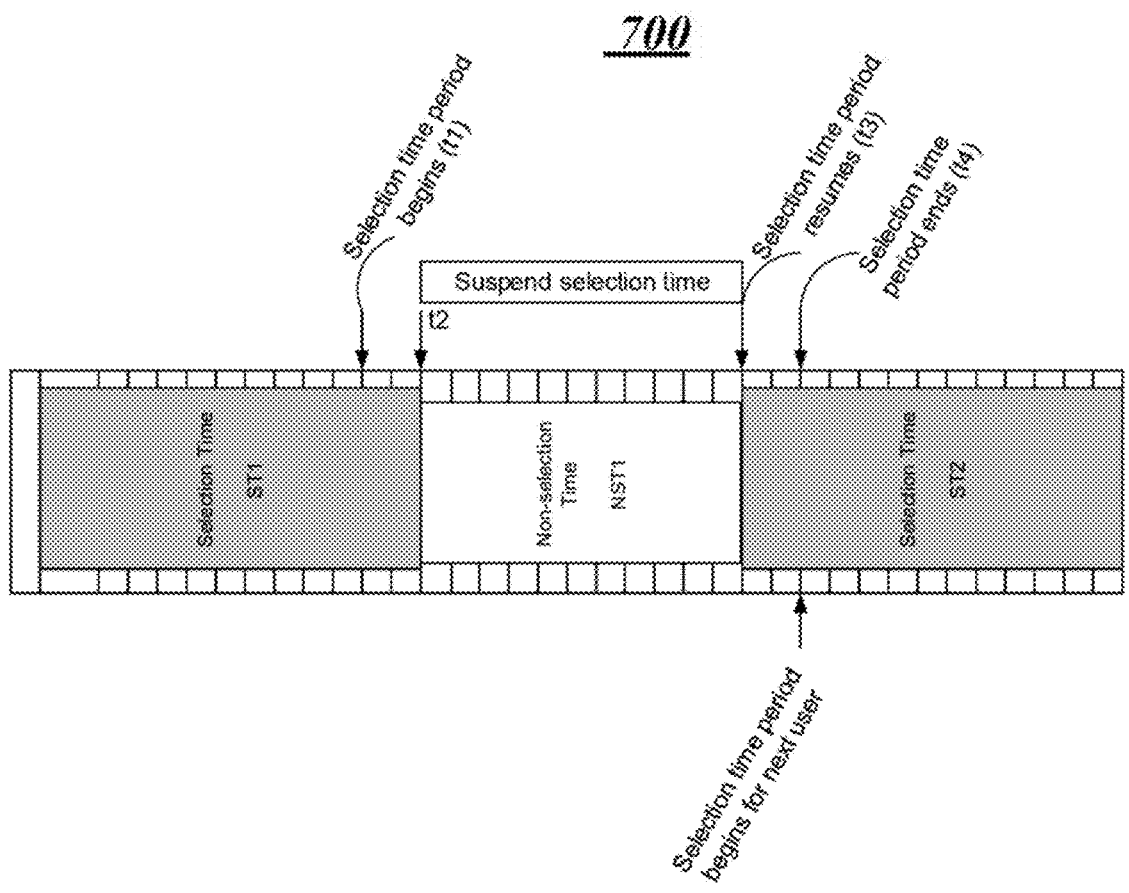
FIG. 7 illustrates an embodiment of a suspended selection period.

When the total time for all users to take all of their turns for a round exceeds one day, the plurality of days needed for the round may be divided into selection times and non-selection times. The non-selection times may be placed during parts of a day when the user may not be able to make selections, for example, during traditional sleeping hours, or during the work day. The turn component 350 may be operative to suspend the selection time period of a user during a non-selection time when no selections may be made; and resume the selection time period for the user at the end of the non-selection time. The elapsed time during the non-selection time does not affect the user's selection time period. An example of this suspension is illustrated in FIG. 7.

In some embodiments, the users may be allowed to keep some of their selections from one round for the next round rather than returning the selections to the general pool for anyone to select. The "keepers" may be selected prior to the beginning of the next round of turns. If a user does select a number n of "keepers," the user's first n turns will be taken automatically for the user, where the keeper becomes the user's selection. The user essentially forfeits having a choice for those first n turns. The keepers may be stored in or associated with a user profile of the participant that selected the keepers.

The turn component 350 may be operative to receive a selection of a number n of choices prior to the start of the turn-based selection process from a client device of the user. Then, for each of the first n turns of the user in the turn-based selection process, the turn component 350 uses a choice from the selected choices as the selection instead of receiving a selection from the user during the turn. The turn component 350 may decrement the number of selections of the user remaining to be made by one at each turn.

The league management component 360 may be operative to receive a selection or other turn operation from the client device during the user's turn in the selection time period. The league management component 360 may update a user profile of the individual user with the received selection or operation. For example, in a fantasy game, the user's roster may be updated to include the selected real-world player. The league management component 360 may decrement the number of turns remaining to be made for the individual user when the selection or turn operation is received.

The league management component 360 may determine a turn order for the plurality of users to take their turns. At the beginning of the process, before any scores or rankings are available, the league management component 360 may determine the turn order randomly, or may order the turns in a snake-draft ordering. The initial order may be determined for example, according to the order in which the players signed up to play, according to age, or any other criteria.

The league management component 360 may generally store and update user profiles for all of the participants in the turn-based process. The user profile may include identifying information for the user, such as user name, team name, contact information, representative image and so forth. The user profile may also include information about what turn operations the user has already taken in a round, what keepers (if any) the user has selected, a time bank allocation for the user, a turn-order, scores, ranks, a list of choices to select from when the user does not provide a turn operation, and so forth.

Once at least one round of the turn-based process has taken place and scores and rankings are available, the turn order may be determined according to the user's ranking as received from the ranking component 330. In some embodiments the highest ranked player will go first. In other embodiments, the lowest ranked player will go first. The embodiments are not limited to these examples.

FIG. 4 illustrates an embodiment of a user interface (UI) 400. The UI 400 may be presented to a user on a client device 110 when setting up an instance of the turn-based process. The UI 400 may be presented by the app 210.

The UI 400 may allow one or more settings from the turn-based process to be modified by the user. The settings may include a number of rounds 402. The number of rounds may be set arbitrarily by the user, or may correspond to a number of weeks in a sport season, for example.

The settings may include a time bank 404. The time bank 404 may be set by the user or may be determined according to other factors, for example, the number of participants in the league or team of users, and beginning and end points of the turn-based process, and a total amount of time available for turns. The time bank 404 may be the total amount of time that one participant has to tale all of their turns within one round.

The settings may include a defined turn time 406, e.g. Tmin, that will be reserved for each turn. The user may be able to modify the defined turn time 406 within a range of values. In some embodiments, the defined turn time 406 may be constrained, for example, to be at least one minute and/or to be no longer than the time bank divided by the number of turns for a user.

The settings may include a start day 408 and an end day 410 for a round when the turn-based process takes place over a plurality of days. The end day 410 may be constrained, in fantasy games, to be before the real-world events that the fantasy game is based on. The start day 408 may be constrained such that the start day cannot be the day on which the real-world events that the fantasy game take place, and may be further constrained to allow one or more days for scoring and other administrative matters to occur before the start of the next round.

The settings may include a selection time beginning 412 and a selection time end 414 that together define the selection time and, by extension, the non-selection time on each day of the multi-day process.

The UI 400 represents one possible embodiment. Other embodiments may include more, fewer, or different settings that may be relevant to the particular turn-based process.

Figure 5:
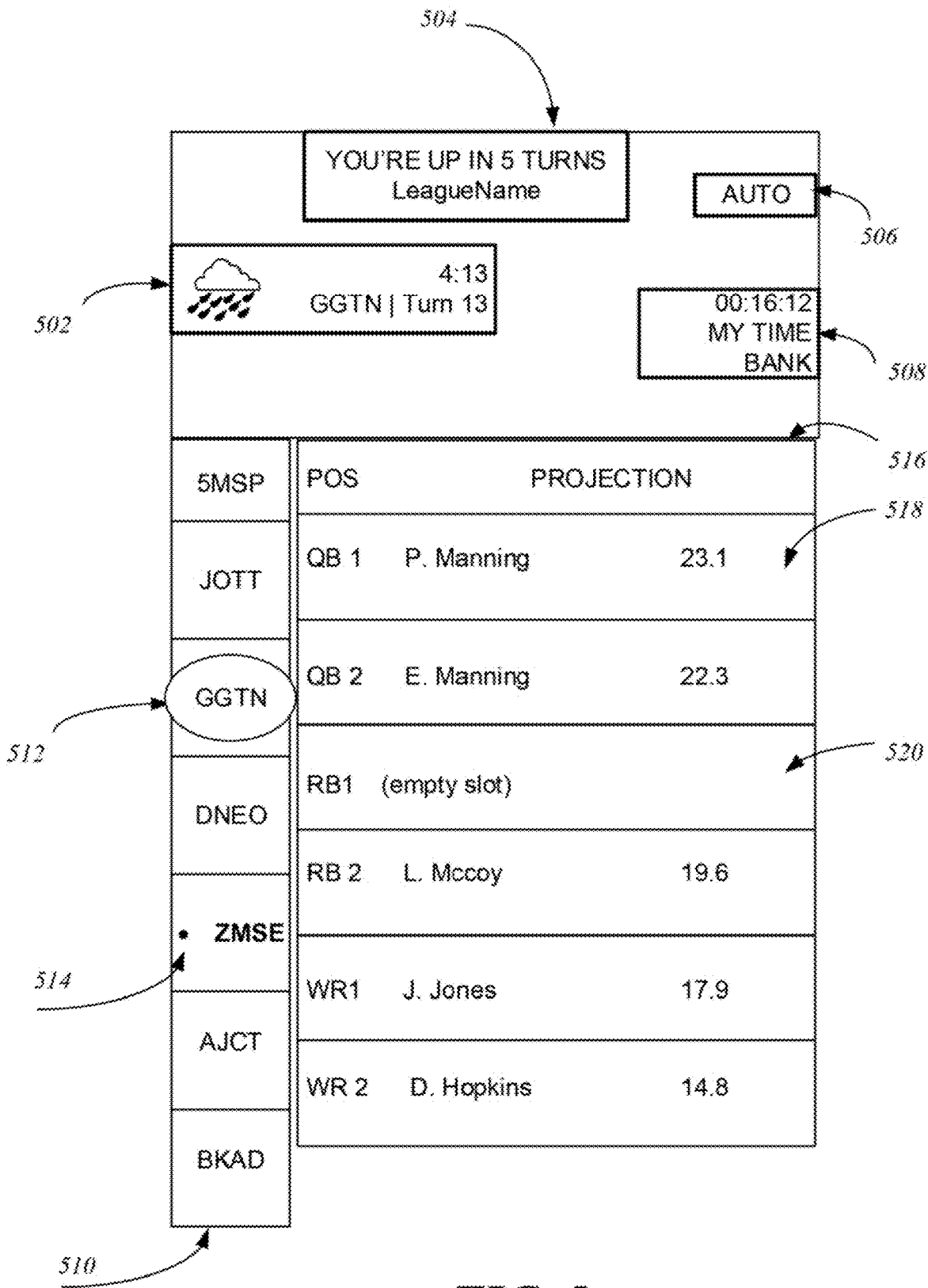
FIG. 5 illustrates an embodiment of a second user interface.

FIG. 5 illustrates an embodiment of user interface (UI) 500. UI 500 may be presented by the app 210. UI 500 may present information to a participant in a turn-based process about the current round of turn-taking. In the illustrated example, the UI 500 relates to a fantasy game. The information presented in the UI 500 may be received from the app server 120.

The UI 500 may display a turn summary 502. The turn summary 502 may include information such as a graphical representation of the user, e.g. a photo or an icon, a team name or the user's name, a time remaining in the current turn, and the turn order number of the user. In some embodiments, the turn summary 502 may change, e.g. in color or size, when the user is currently taking a turn.

The UI 500 may include a header region that includes information 504 about where the user is in the turn-taking. As shown, the user's turn will start after five other users have had their turns.

The UI 500 may include an auto-pick toggle 506. When turned on, the turn component 350 will choose for the user automatically when the selection time period for the user begins, without a selection from the user.

The UI 500 may provide an indication of the total remaining time for the user with time bank indicator 508. The time presented by the time bank indicator 508 represents the total time remaining for the user to take all of their remaining turns for the round.

The UI 500 may present a turn order summary 510 that shows the turn order for all of the participants taking part in the same turn-based process. The turn order summary 510 may show an indication 512 of the user's position in the turn order, and an indication 514 of which user is currently taking a turn.

The UI 500 may show a summary 516 of the turns already taken and remaining to be taken by the user. For example, in the fantasy game, the user has already made a selection for the roster slot 518, and has not yet made a selection for roster slot 520.

Figure 6:
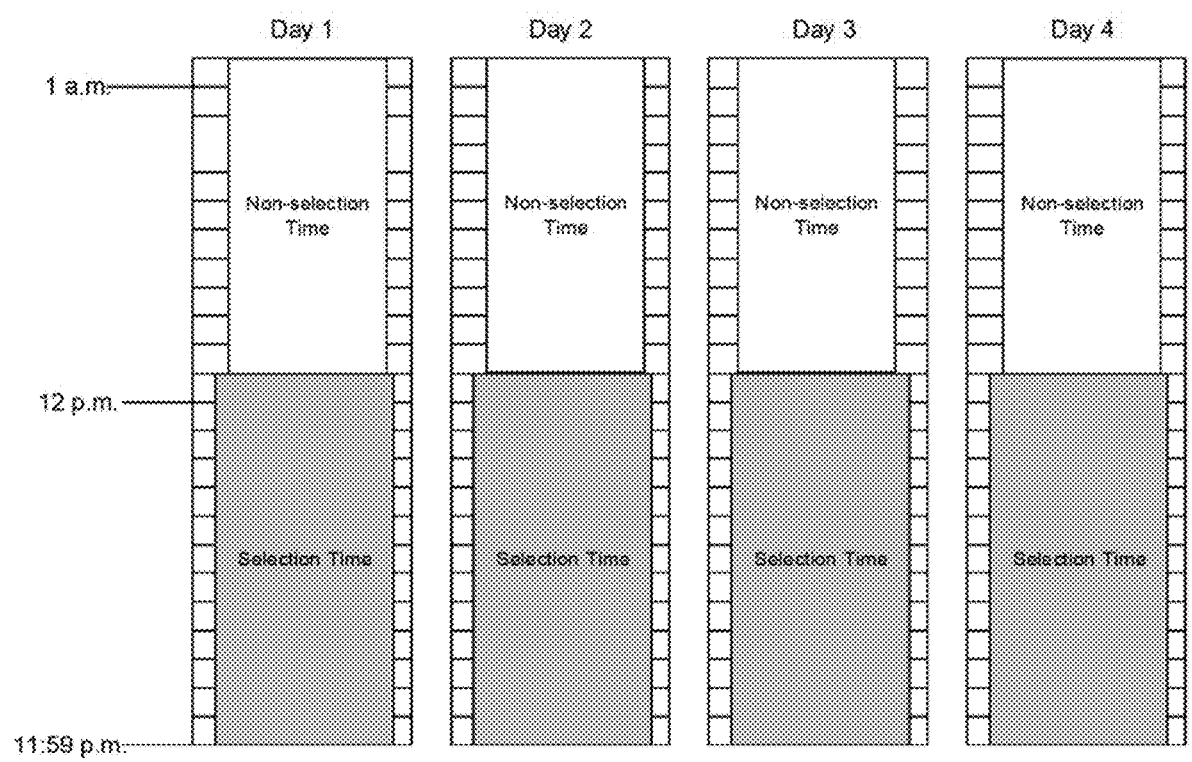
FIG. 6 illustrates an embodiment of a multi-day selection period.

FIG. 6 illustrates an embodiment of multi-day selection period 600. In the illustrated example, the turn-based selection process spans a total of four days, but does not span all of the hours in each day. Instead, the selection time spans from 11 a.m. to midnight on each of the four days, resulting in a total of 52 hours for all of the turns to be taken. Each day also has a non-selection time, e.g. between midnight and 11 a.m. Dividing the multi-day selection period into selection time and non-selection time prevents a turn for a user from falling during hours where the user is likely to be unavailable, e.g. asleep.

FIG. 7 illustrates a diagram 700 of a selection period suspended during a non-selection time. Diagram 700 may represent, for example, the selection time ST1 at the end of day 2 of the multi-day selection period 600, the non-selection time NST1 at the beginning of day 3, and the selection time ST2 of day 3. The turn of a particular user may begin during ST1 at t1. The selection time of the user may be four hours. However, there are only two hours between t1 and the start of NST1 at t2. At the start t2 of NST1, the selection time for the user is suspended until the end of NST1 at t3. The elapsed time of NST1 (t3–t2) is not counted toward the user's selection time, and no selections by the user may be received during NST1.

When NST1 ends, the user's selection time resumes at t3. Because the user has not yet made a selection or otherwise taken a turn, the selection time remaining is two hours. The user's selection time ends at t4, which also corresponds to the beginning of the next user's selection time. Time t4 may represent the time at which a selection is received from the user, or the turn is otherwise completed. Any unused portion of the selection time may be retained for use in future turns for that multi-day selection period. Alternatively, t4 may represent the end of the selection time period.

FIGS. 8-11 illustrate embodiments of message flows that may represent messages communicated among the components of system 100. In a message flow, time flows from the top of the diagram toward the bottom. The "messages" communicated among the components may include data and/or instructions communicated from one component to another, as well as internal functions within a component.

Figure 8:
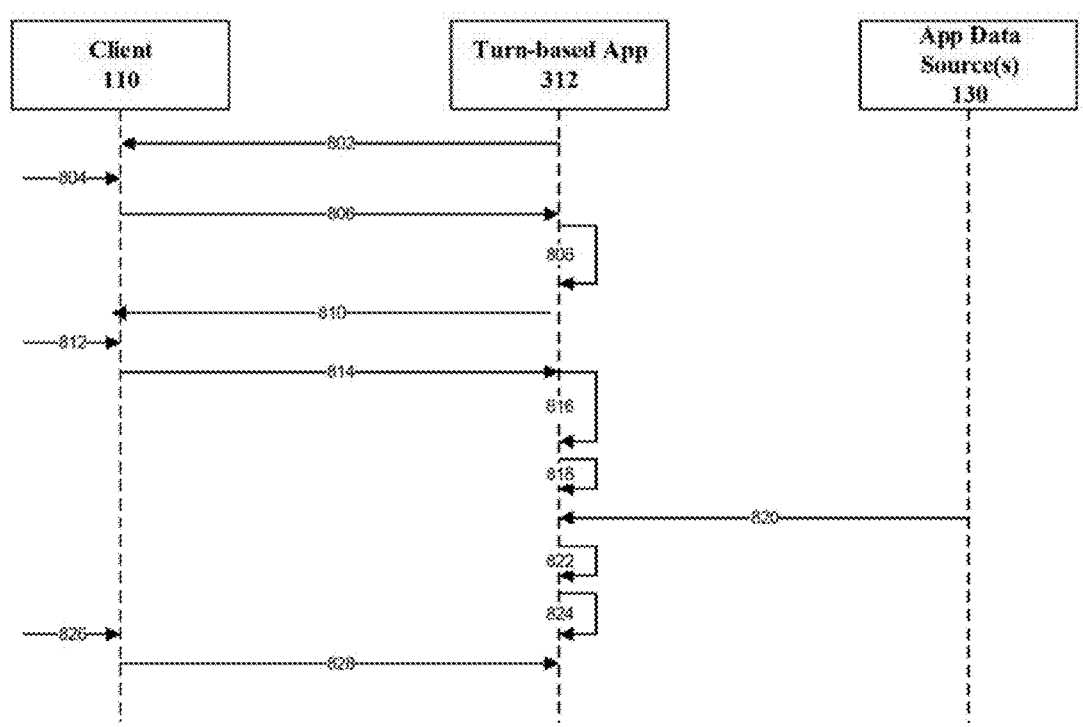
FIG. 8 illustrates an embodiment of a first message flow.

FIG. 8 illustrates an embodiment of a message flow 800. In particular, message flow 800 may occur among one or more clients 110, the turn-based app 312 and app data sources 130. The message flow 800 may represent some of the messages that are communicated when a turn-based process is set up and executes for one round.

The message flow 800 begins when the turn-based app 312 sends an invitation in the message 802 to the client device 110 to join a collaborative group, team, or league of other users who will take turns during a turn-based process, e.g. a game. In an embodiment, a user of a different client device 110 may initially create the group and may provide various means for the turn-based app 312 to invite others to join the group. For example, email addresses, mobile phone numbers, user profile identifiers, social media profile identifiers, and so forth, may be used to send an invitation to other users. The message 802 may include a link to a website where the user may register to use the turn-based app 312 and join the particular group. The message 802 may include a link to an application repository from which the user can download the app 210 for use on the client device 110. The message 802 may cause a registration or log-in user interface to be displayed on the client device 110.

The message flow 800 continues when the client device 110 receives user input in message 804. The user input may include a control directive from the user selecting a link as described above. The user input may include input such as a user name and password, or other information that may be used to create and/or authenticate a user profile with the turn-based app 312. The user input may be input to initiate a telephone call or a simple message service (SMS) message to create and/or authenticate a user profile with the turn-based app 312.

The message flow 800 continues when the turn-based app 312 receives message 806 from the client to accept the invitation. The message 806 may include, for example, a web request to access a link, or may include profile creation information as described above. In some embodiments, the message 806 may represent a plurality of messages as the user provides information to create an profile and/or join a league. For example, the user may also provide a graphic or photo to use as a representation of the user, a user name or team name for the user, contact information, preferences, banking or billing information, and so forth.

Messages 802, 804 and 806 may also be exchanged with a plurality of other client devices 110 as other users are invited and join the group.

The message flow 800 continues when the turn-based app 312 determines, in message 808, that the league is full or has a sufficient number of participants, and that the first round of the turn-based process, e.g. a draft, can begin.

The message flow 800 continues when the turn-based app 312 notifies the client device 110 that the user's turn has begun in message 810. The message 810 may include text, graphics, and/or data for use by the app 210 to present the notification. For example, the message 810 may include text that states "It's your turn!", "You're on the clock.", or "Your turn has started." The message 810 may include a graphic or a reference to a graphic, e.g. an image of a stop watch. The message 810 may include data that causes the app 210 to present a selectable user interface element, such as a button, that when selected, opens the app 210 or brings the app 210 to the foreground and presents a turn-taking interface. In some embodiments, the message 810 may also include information about how much time the user has to take that turn.

The message flow 800 continues when the client device 110 receives user input in message 812. The user input may include one or more control directives used to take a turn. Assuming that a turn-taking interface is presented to the user, the user input may, for example, include a first control directive to select an option from a list of options, and a second control directive to submit the selected option to the turn-based app 312. In some embodiments, a turn may require other operations, such as entry of text into a text field, using a touch-input to move a user interface element from one part of a display to another, providing sound input into a microphone, and/or moving the client device in a particular motion or sequence of movements. The embodiments are not limited to these examples.

The message flow 800 continues when the client device 110 communicates the user input to the turn-based app 312 in message 814. For example, the app 210 may communicate the user input or information about the user input to the turn-based app 312. The app 210 may determine a selection based on what user interface element received a control directive, or may provide the user input as it was received.

The message flow 800 continues when the turn-based app 312 updates the turn-based process according to the user input, in message 816. For example, when a turn operation includes a selection, a user profile for the user making the selection may be updated to indicate the selection made. In a fantasy game, for example, a roster in the user profile may be updated to have a slot filled with the selection.

The messages 810, 812, 814, and 816 may also be exchanged with a plurality of other client devices 110, and may be repeated with each of the plurality of client devices for a plurality of turn cycles until the round is over. A turn cycle refers to the time period over which each of the users takes one turn. A round may be comprised of a plurality of turn cycles.

The message flow 800 continues when the turn-based app 312 determines, in message 818, that the round is over. The round may be over when all of the users participating in the group turn-based process have taken all of their turns for the round.

The message flow 800 continues when the turn-based app 312 receives data from the app data sources 130 in message 820. In some embodiments, the turn-based app 312 may request data from the app data sources 130. In other embodiments, the app data sources 130 may send data relevant to the turn-based process at the end of a round. The data may include raw data and/or statistical data based on the raw data.

The message flow 800 continues when the turn-based app 312 calculates scores and ranks of the users in message 822. The turn-based app 312 may calculate scores based on the turn-operations selected by each user and the data received from the app data sources 130. In a fantasy game embodiment, the scoring may be based on one or more aspects of the real-world performance of the real-world players on a user's roster. The users in the particular group may then be ranked according to their respective scores.

The message flow 800 continues when the turn-based app 312 determines a turn order for the next round of the turn-based process in message 824. For example, the turn-based app 312 may base a turn order directly on the best-to-worst ranked users, where the top ranked user gets the first turn in turn cycle and the worst-ranked user gets the last turn in the turn cycle. In some embodiments, the worst-ranked user may get the first turn, and so forth.

The message flow 800 continues when the client device 110 receives user input in optional message 826. The user input in message 826 may indicate one or more selections of turn operations made in the previous round that the user wishes to keep or repeat in the next round. In a fantasy game embodiment, the one or more selections may include roster selections used by the user in the previous round.

The message flow 800 continues when the client device 110 sends message 828 to the turn-based app 312. The message 828 may include the selections received in the message 826. In an embodiment, these selections, also referred to as "keepers," are used instead of user selection during the first one or more turns of the user. The user gets the benefit of being able to retain preferred selections, but sacrifices their ability to choose from the larger pool of turn operations during their first one or more turns.

Figure 9:
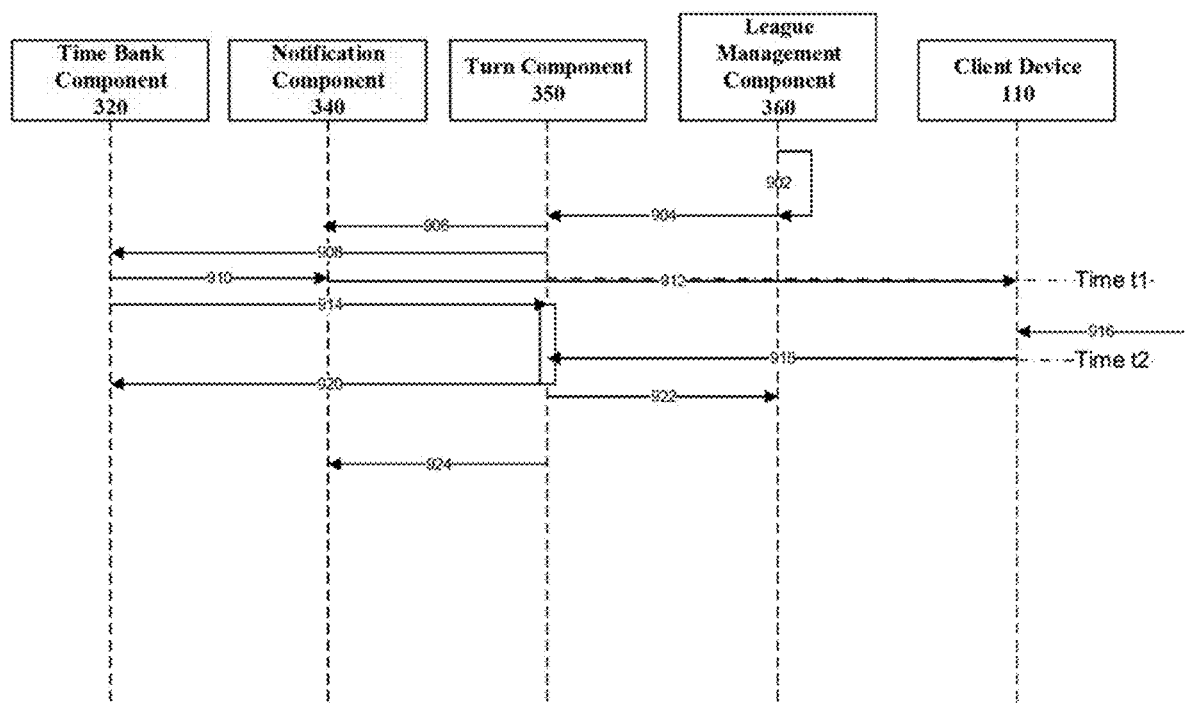
FIG. 9 illustrates an embodiment of a second message flow.

FIG. 9 illustrates an embodiment of a message flow 900. In particular, message flow 900 may occur among the functional components of the turn-based app 312 and a client device 110. Message flow 900 may represent messages communicated during a user's turn.

Message flow 900 begins when the league management component 360 determines a turn order in message 902.

When ranking information is available, the turn order may be determined according to the ranking of the user. When no ranking formation is available, the turn order may be randomly decided, or may be based on some other criteria.

Message flow 900 continues when the league management component 360 provides the turn order to the turn component 350 in message 904. In some embodiments, the entire turn-order list may be provided in message 904. A turn-order list may include some ordered data set that identifies each user in the group, e.g. by a user name, in the order of the turns. In other embodiments, the message 904 may only include an identifier for the user whose turn is next.

Message flow 900 continues when the turn component 350 provides the turn order to the notification component 340 in message 906. As with message 904, the message 906 may be the entire-turn order list or an identifier of the user having the next turn.

Message flow 900 continues when the turn component 350 causes the time bank component 320 to calculate the selection time period for the user in message 908. The message 908 may include, for example, a user identifier of the user having the next turn, or a link to the user profile of the next user, and a command or instruction to the turn component 350 to calculate the selection time period for the user. The time bank component 320 may then calculate the selection time period for this turn for this user. The selection time period may be a function of a time bank allocation for the user, a number of selections, and a defined time for selections, e.g. equation (1) or equation (2).

Message flow 900 continues when the time bank component 320 causes the notification component 340 to notify the user in message 910. The message 910 may include the calculated amount of the selection time period for the user, and a command or instruction to the notification component 340 to send a notification.

Message flow 900 continues when the notification component 340 sends a notification to the client device 110 in message 912. The sending of message 912 may occur at a first time, e.g. at time t1. The message 912 may be similar or identical to the message 810, e.g. the message 912 may include text, graphics, and/or data for use by the app 210 to present the notification that the user's turn has begun Message flow 900 continues when the time bank component 320 informs the turn component 350 that the selection time period is initiated in message 914. The sending of message 914 may occur substantially simultaneously with the sending of the message 912, i.e. at time t1, but is shown separately for clarity.

Message flow 900 continues when the client device 110 receives a user input in message 916. The user input and message 916 may be as described above with respect to user input and message 812.

Message flow 900 continues when the client device 110 sends an operation associated with the user input to the turn component 350 in message 918. The message 918 may be as described above with respect to message 814. The message 918 is received at a second time, e.g. at time t2.

Message flow 900 continues when the turn component 350 notifies the time bank component 320 that the user has completed a turn in message 920. The message 920 may include the time t2, and may cause the time bank component 320 to update a time bank allotment for the user. For example, the difference of (time t2−time t1) may itself be subtracted from the time bank allotment in the user's profile.

Message flow 900 continues when the turn component 350 provides the turn operation to the league management component 360 for updating a user profile for the user in message 922. The message 922 may be as described above with respect to the message 816.

Message flow 900 continues when the turn component 350 prompts the notification component 340 to notify the next user of the start of their turn in message 924. The message 9240 may cause the notification component 340 to refer to its copy of the turn-order list, or may include an identifier of the next user in the turn order.

The message flow 900 may be repeated, at least in part, for each user in the group and for each of the turn cycles in a round. For example, the messages 908-924 may be repeated until all of the users have taken all of their turns.

Figure 10:
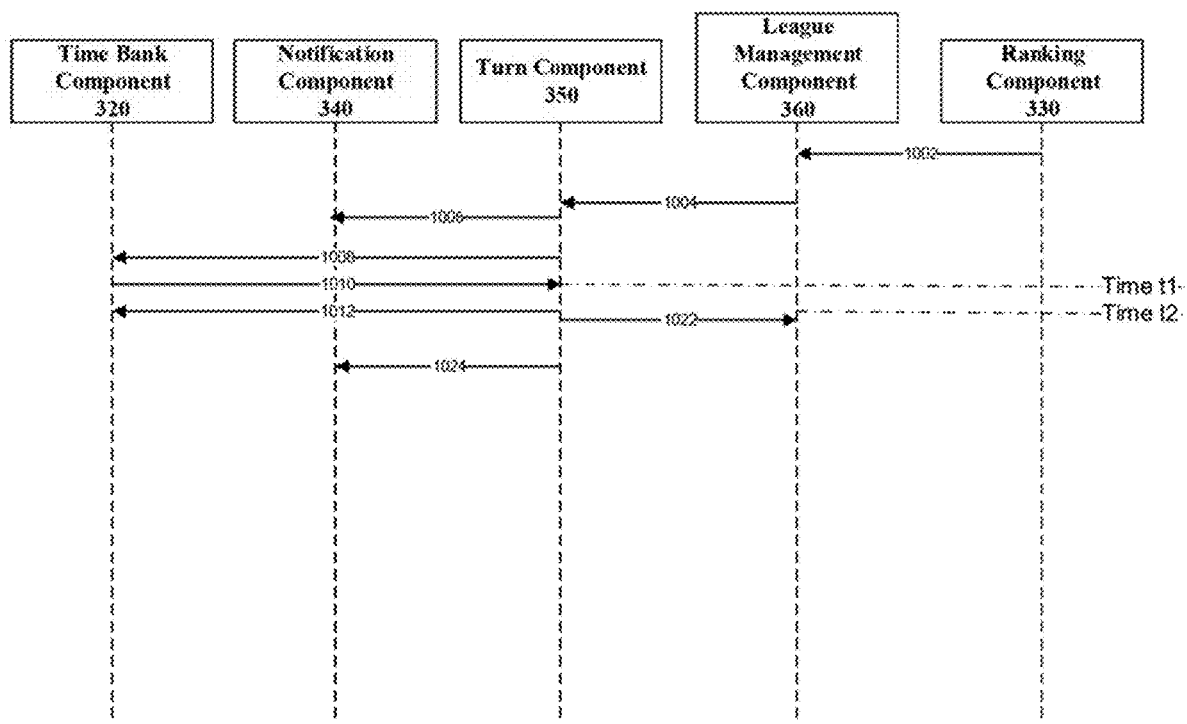
FIG. 10 illustrates an embodiment of a third message flow.

FIG. 10 illustrates an embodiment of a message flow 1000. Message flow 1000 may represent messages communicated among the components of system 100. In particular, message flow 1000 may occur among the functional components of the turn-based app 312. Message flow 1000 may represent messages communicated during a user's turn when the user has selected a "keeper".

Message flow 1000 begins when the ranking component 350 provides a ranking of the users in a particular league to the league management component 360 in message 1002. For example, the ranking component 330 may calculate scores based on the turn-operations selected by each user and the data received from the app data sources 130.

Message flow 1000 continues when the league management component 360 provides the turn order to the turn component 350 in message 1004. The league management component 360 may use the ranking order to determine the turn-order and provide the turn order to the turn component 350 as described above.

Message flow 1000 continues when the turn component 350 provides the turn order to the notification component 340 in message 1006. The message 1006 may be as described above with respect to the message 906.

Message flow 1000 continues when the turn component 350 informs the time bank component 320 that the user has selected a keeper in message 1008. The message 1008 may serve to have the time bank component 320 start a selection time period for the user, but not prompt notifications to the user that their turn has begun.

Message flow 1000 continues when the time bank component 320 informs the turn component 350 that the selection time period is initiated in message 1010. The message 1010 may be as described above with respect to the message 914. The message 914 may cause the turn component 350 to use the "keeper" as the selection for the user's turn instead of waiting for input from the client device 110.

Message flow 1000 continues when the turn component 350 notifies the time bank component 320 that the user's turn is completed in message 1012. The message 1012 may be as described above with respect to the message 920.

Message flow 1000 continues when the turn component 350 provides the keeper to the league management component 360 for updating a user profile for the user in message 1014. The message 1014 may be as described above with respect to the message 922, except that the "keeper" is used instead of a selection received from the client device. In some embodiments, the keeper is already associated with the user profile, for example, when the keeper selections are received from the client device in message 828 of the message flow 800.

The elapsed time between the messages 1008 and 1014, e.g. the time between time t1 and time t2, may be very short, for example on the order of 1-5 seconds or hundreds of milliseconds. In some embodiments, the time bank allotment for the user may be unaffected by the time taken by a "keeper" selection. In other embodiments, the defined time allotted for each turn may be subtracted from the user's time bank allotment, even if not all of the defined time was used during the turn. In still other embodiments, the amount (time t2−time t1) may be subtracted from the user's time bank allotment, even if very brief.

Message flow 1000 continues when the turn component 350 prompts the notification component 340 to notify the next user of the start of their turn in message 1016. The message 1016 may be as described above with respect to the message 924.

Figure 11:
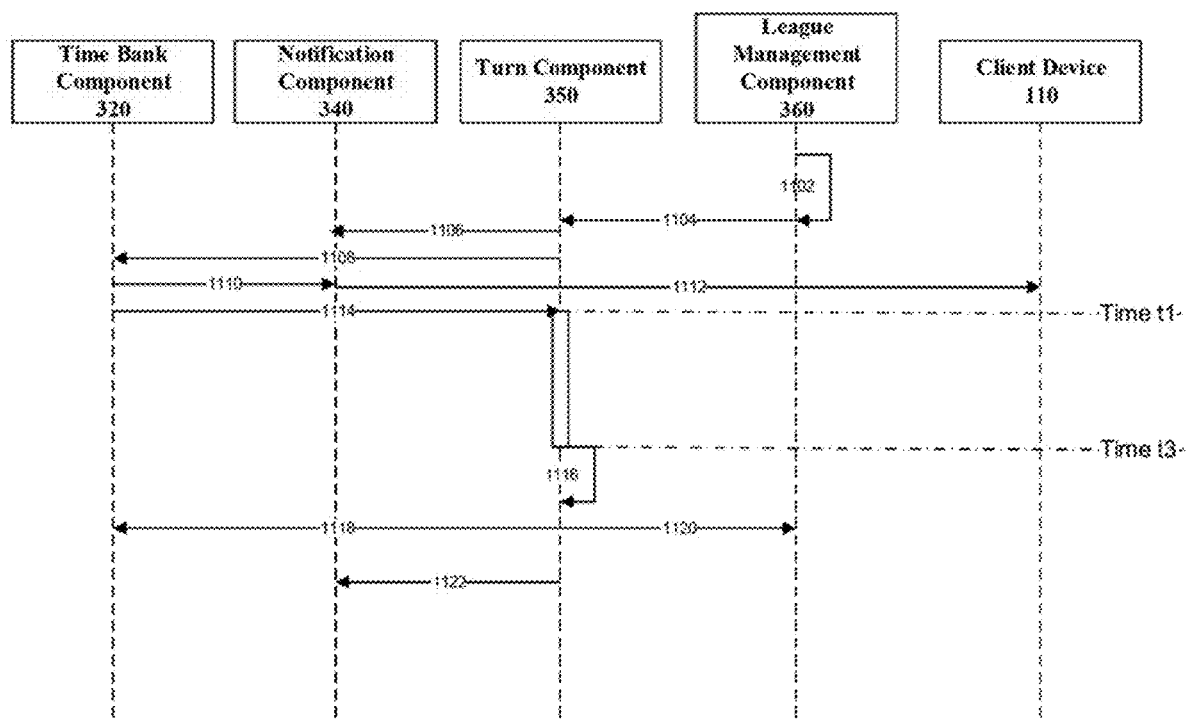
FIG. 11 illustrates an embodiment of a fourth message flow.

FIG. 11 illustrates an embodiment of a message flow 1100. Message flow 1100 may represent messages communicated among the components of system 100. In particular, message flow 1100 may occur among the functional components of the turn-based app 312 and a client device 110. Message flow 1100 is similar to message flow 900, and represent messages exchanged during a user's turn when the user does not take a turn action.

Message flow 1100 begins similarly to message flow 900, and messages 1102, 1104, 1106, 1108, 1110, 1112, and 1114 are analogous to messages 902, 904, 906, 908, 910, 912, and 914.

Message flow 1100 continues when the turn component 350 does not receive a turn operation from the client device by the end of the selection time period at time t3. The turn component 350 may then automatically take a turn operation for the user in message 1116. For example, the turn component 350 may be operative to make a selection from a set of choices associated with the user profile. A user may create a list of preferred selections from the pool of available choices. The list does not correspond to actual turn selections taken by the user, but acts a "wish list" for that turn operations the user would like to take.

If the user has not generated a list, or when the choices on the list are no longer available, the turn component 350 may be operative to determine a set of available choices for the user's selection from the remaining pool of choices. When more than one possible choice remains, the turn component 350 may retrieve statistical data about the remaining choices in the set of available choices, for example, from the app data sources 130. The turn component 350 may analyze the set of available choices according to the statistical data; and may select a best available choice of the available choices.

Message flow 1100 continues when the turn component 350 notifies the time bank component 320 that the user's turn is completed in message 1118.

Message flow 1100 continues when the turn component 350 provides the turn operation to the league management component 360 for updating a user profile for the user in message 1120. The turn operation in this case is the selection made automatically by the turn component 350.

Message flow 1100 continues when the turn component 350 prompts the notification component 340 to notify the next user of the start of their turn in message 1122.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 12:
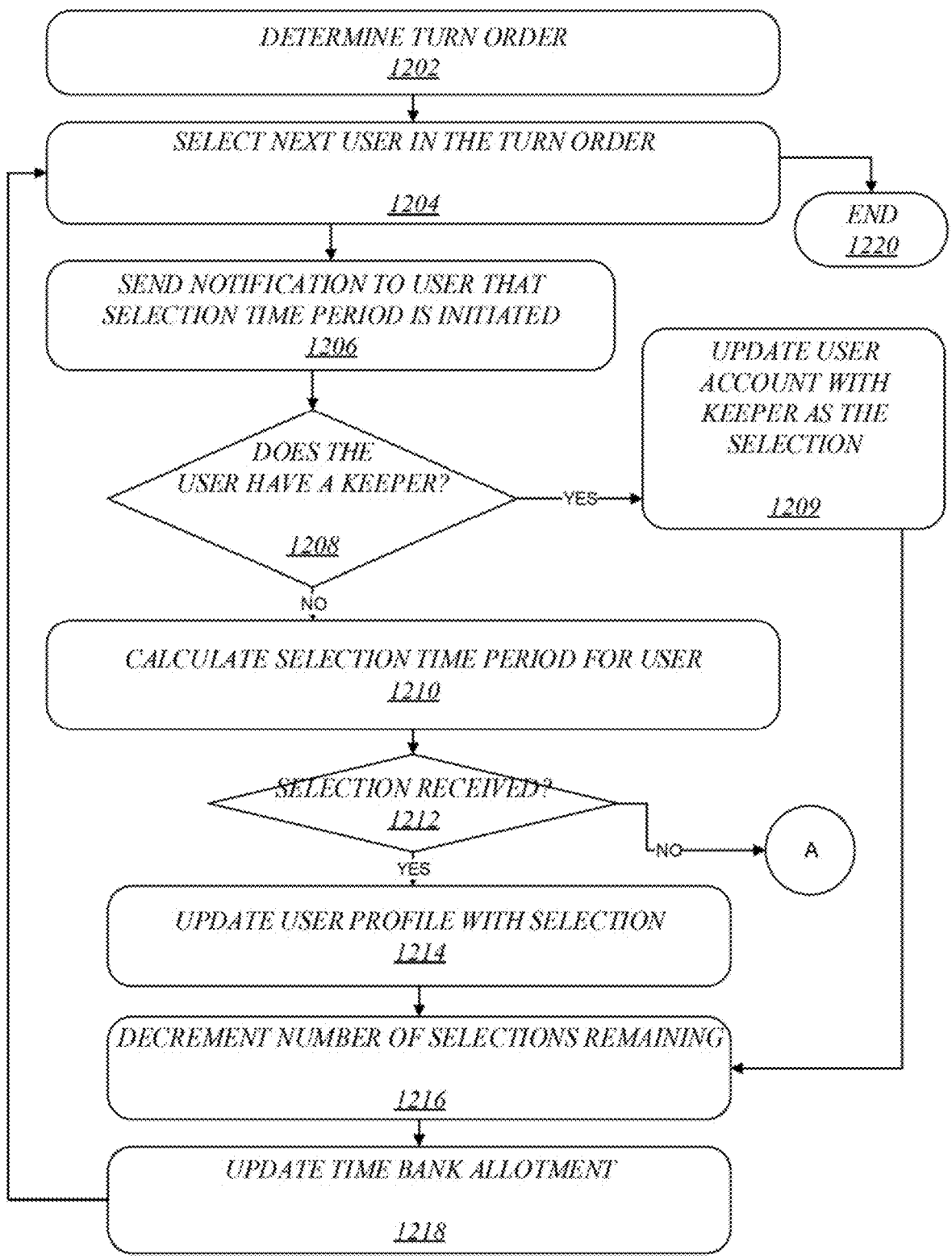
FIG. 12 illustrates a logic flow for the system of FIG. 1.

FIG. 12 illustrates a logic flow 1200. The logic flow 1200 may be representative of some or all of the operations executed by one or more embodiments described herein. In particular, the logic flow 1200 may represent the operations executed by the app server 120 during a turn-based process according to various embodiments.

In the illustrated embodiment shown in FIG. 12, the logic flow 1200 may determine a turn order at block 1202. For example, the turn component 350 may, at the beginning of a round, receive ranking information about the participants from the ranking component 330. The turn component 350 may determine the turn order according to the rankings, for example, the highest ranked player may get the first turn, and subsequent players may be ordered according to decreasing rank. Alternatively, the lowest ranked player may get the first turn and subsequent players may be ordered according to increasing rank. If no rankings are available, e.g. at the very beginning of the turn-based process, the participants may be ordered randomly, or according to other criteria such as age, earliest to sign up, and so forth.

The logic flow 1200 may select the next user in the turn order at block 1204. If no users have taken a turn yet, the "next" user may be the first user in the turn order. If all of the users have taken all of their turns, the logic flow 1200 ends at block 1220.

The logic flow 1200 may send a notification to a client device of the selected user indicating that the selection time period, e.g. the user's turn, is initiated at block 1206. The notification may be sent at a first time, for example, by the notification component 340. The notification may include a link or other user interface element that, when selected on the client device, opens the app 210 to a user interface for taking a turn.

The logic flow 1200 may determine whether the user has selected a "keeper" at block 1208. Prior to the beginning of a round of the turn-based process, the participants may have the option to re-use or "keep" one or more selections, or other turn operations, from the round that just ended. If the user has designated a keeper, the logic flow 1200 may use the keeper as a selection for the user at block 1209 and the logic flow 1200 proceeds to block 1212. When a user does designate a "keeper", the "keeper" may not be available to any of the other users during that round.

The logic flow 1200 may calculate a selection time period at block 1210, either when no keepers were designated at block 1208, or when all designated keepers have already been added to the user profile in previous turns. The selection time period may be calculated by the time bank component 320 as a function of a time bank allotment for a user profile, a defined time for a selection, and a number of available selections, for example, as in equations (1) or (2).

The logic flow 1200 may determine whether a selection has been received from the client device at block 1212. If no selection has been received, the logic low 1200 may proceed to the logic flow 1300 via point "A".

When a selection is received, the logic flow 1200 may update the user profile at block 1214. For example, the league management component 360 may add the selection to an empty slot in the user profile. In some embodiments, the selected item, e.g. a data object representing a real-world player selected to be in a user's fantasy league, may be associated with the user profile.

The logic flow 1200 may decrement the number of selections remaining at block 1216. For example the league management component 360 may decrease a count of remaining turns or selections by one. In some embodiments, the number of selections remaining may be determined instead by the number of empty slots in the user profile, rather than by a separate count variable.

The logic flow 1200 may update the time bank allotment at block 1218. For example, the time bank component 320 may determine an amount of time used between the first time when the notification was sent and a second time when the selection was received. The time bank component 320 may update the time bank allotment, for example, by subtracting the used time from the time bank allotment of the user profile. The updated time bank allotment may then be used to calculate a new selection time period for the user profile at the start of the next turn for the user profile.

Figure 13:
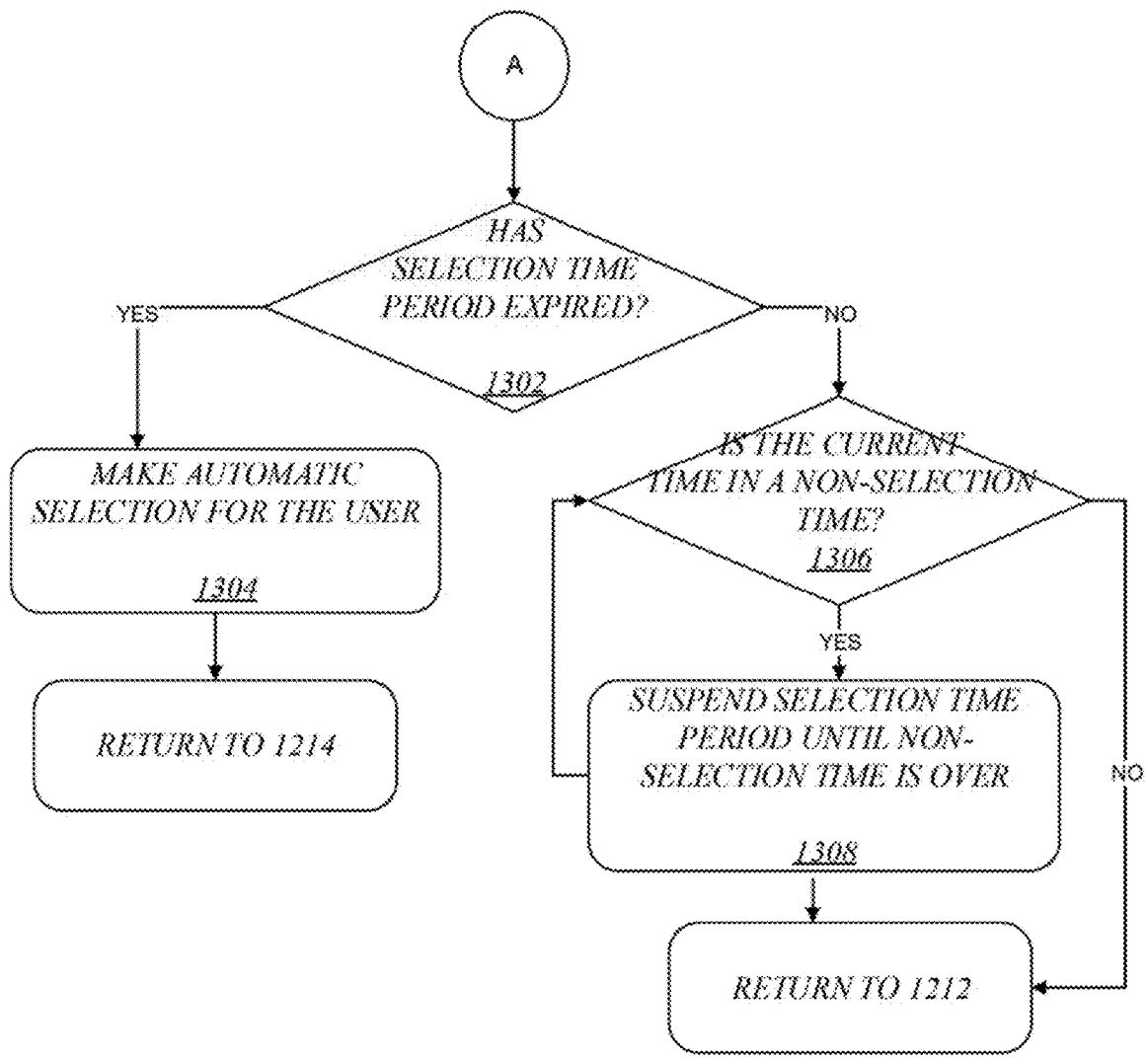
FIG. 13 illustrates a second logic flow for the system of FIG. 1.

FIG. 13 illustrates a logic flow for the system of FIG. 1. The logic flow 1300 may be representative of some or all of the operations executed by one or more embodiments described herein. In particular, the logic flow 1300 may represent a continuation of the logic flow 1200 at point "A".

In the illustrated embodiment, shown in FIG. 13, the logic flow 1300 may determine whether the selection time period has expired at block 1302.

The logic flow 1300 may make a selection for the user automatically at block 1304, when the selection time period has expired. For example, the turn component 350 may attempt to select from a user-specified set of choices associated with the user profile. If none of the choices on the user-specified list are available, e.g. if the choices were selected by other users, or if none of the available choices may be used for the empty slots, the turn component 350 may request statistical information about available choices that may be used for the user profile's empty slots from the app data sources 130.

In making a selection for the user, the turn component 350 may analyze the statistical information and take the best available choice as the user's selection. The "best" available choice may be context dependent and may depend on the statistical information provided for the choices. For example, if a statistic includes an average number of errors made by a real-world player, "best" may mean the player with the lowest average number of errors. If a statistic includes an average number of yards run, "best" may mean the player with the highest average number of yards. In some embodiments, a plurality of statistics may be considered together. Some or all of the statistics may be weighted with respect to each other. The logic flow 1300 may then return to block 1214 of the logic flow 1200.

The logic flow 1300 may determine whether the current time is in a non-selection time period at block 1306, when the selection time period has not expired. For example, the turn component 350 may determine whether a non-selection time period has begun.

The logic flow 1300 may suspend the selection time period at block 1308, when current time is in a non-selection time period, until the non-selection time period ends.

The logic flow 1300 may return to block 1212 of the logic flow 1200 either at the end of the non-selection time period, or when the current time is not in a non-selection time period.

Figure 14:
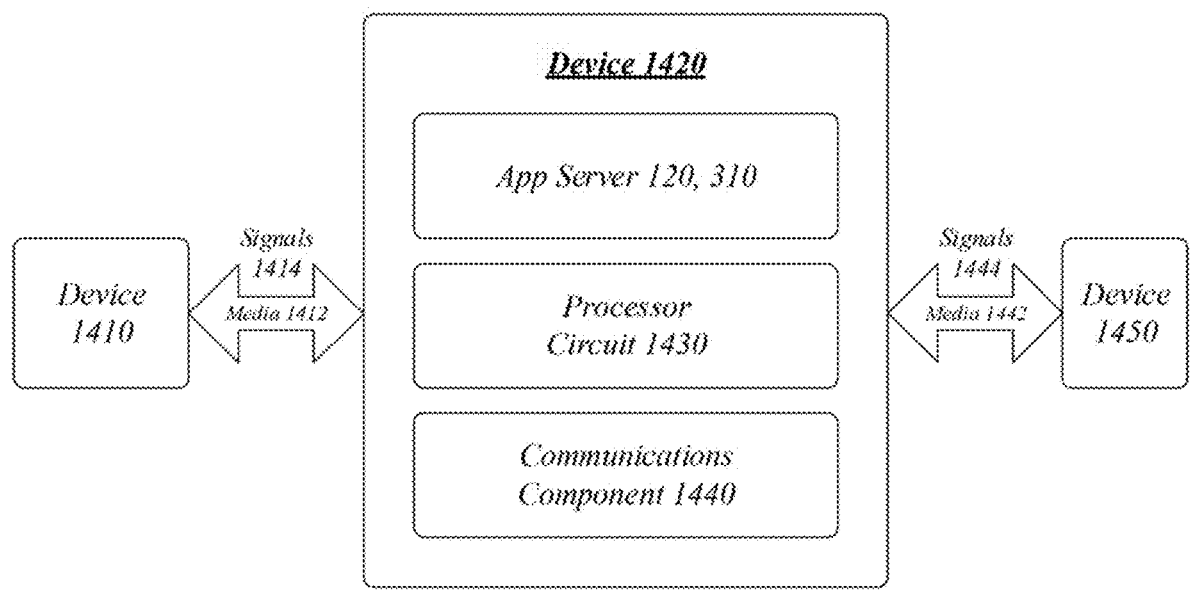
FIG. 14 illustrates an embodiment of a centralized system.

FIG. 14 illustrates a block diagram of a centralized system 1400. The centralized system 1400 may implement some or all of the structure and/or operations for the system 100 in a single computing entity, such as entirely within a single device 1420.

The device 1420 may comprise some or all of the components of the app server 120, 310, and may also include a processor circuit 1430 and a communications component 1440.

The device 1420 may execute communications operations or logic for the system 1400 using communications component 1440. The communications component 1440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1412, 1442 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1420 may communicate with other devices 1410, 1450 over communications media 1412, 1442, respectively, using communications signals 1414, 1444, respectively, via the communications component 1440. The devices 1410, 1450 may be internal or external to the device 1420 as desired for a given implementation. Devices 1410, 1450 may include, for example, client devices 110, and app data sources 130.

Figure 15:
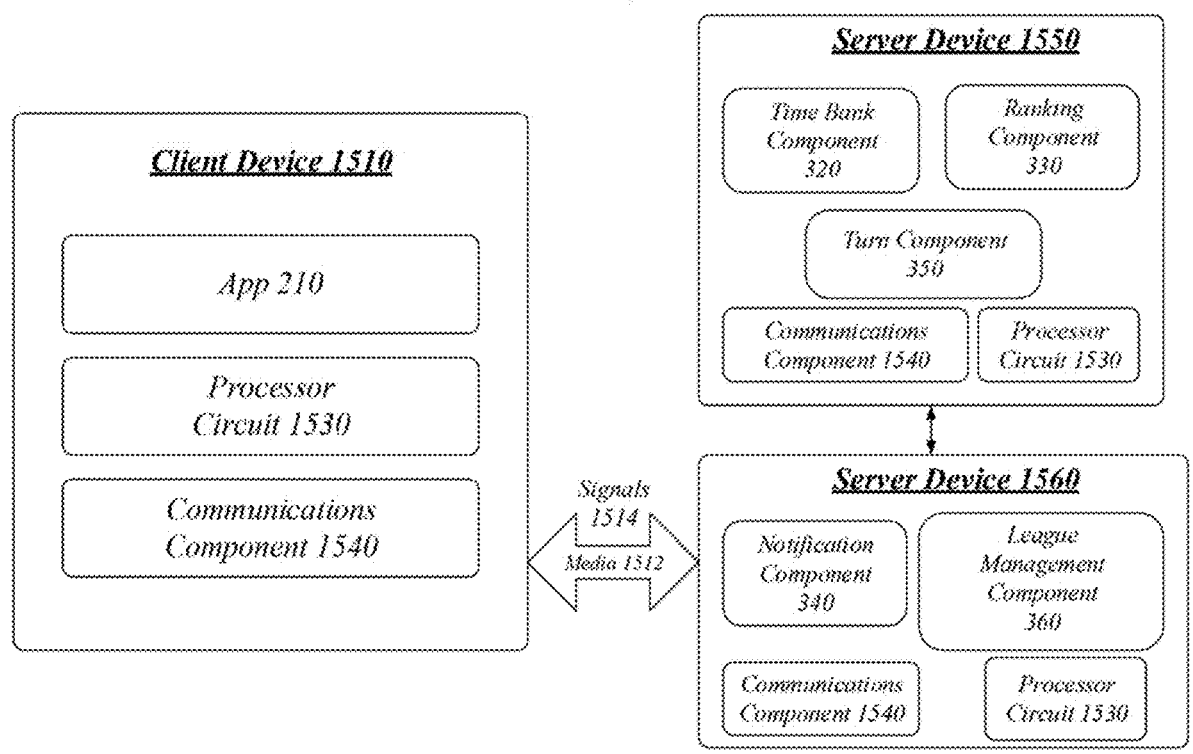
FIG. 15 illustrates an embodiment of a distributed system.

FIG. 15 illustrates a block diagram of a distributed system 1500. The distributed system 1500 may distribute portions of the structure and/or operations for the system 100 across multiple computing entities. Examples of distributed system 1500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1500 may comprise a client device 1510 and a server devices 1550 and 1560. In general, the client device 1510 may be the same or similar to the client device 110, 200, and the server devices 1550 and 1560 may be the same or similar to app server 120, 310, as described with reference to FIGS. 1-3. For instance, the client system 1510 and the server devices 1550 and 1560 may each comprise a processor circuit 1530 and a communications component 1540 which are the same or similar to the processor circuit 202, and the communications component 208 and network interface 308, respectively. In another example, the devices 1510, 1550 and 1560 may communicate over a communications media 1512 using communications signals 1514 via the communications components 1540.

The client device 1510 may comprise or employ one or more client programs that operate to perform various methodologies in accordance with the described embodiments. In one embodiment, for example, the client device 1510 may implement app 210.

The server device 1550 may comprise or employ one or more server programs that operate to perform various methodologies in accordance with the described embodiments. In one embodiment, for example, the server device 1550 may implement at least some of the components of app server device 310, such as the time bank component 320, the ranking component 330 and the turn component 350.

The server device 1560 may implement some or all of other components of the app server device 310, such as the notification component 340 and the league management component 360. Client device 1510 may, for example, receive notifications related to the turn-based process from the turn component 350 via the notification component 340. Client device 1510 may receive data for app 210 to present, for example, a user interface related to taking a turn from the league management component 360, the turn component 350, the ranking component, and/or the time bank component 320. Other server devices may implement, for example, the app data sources 130.

Figure 16:
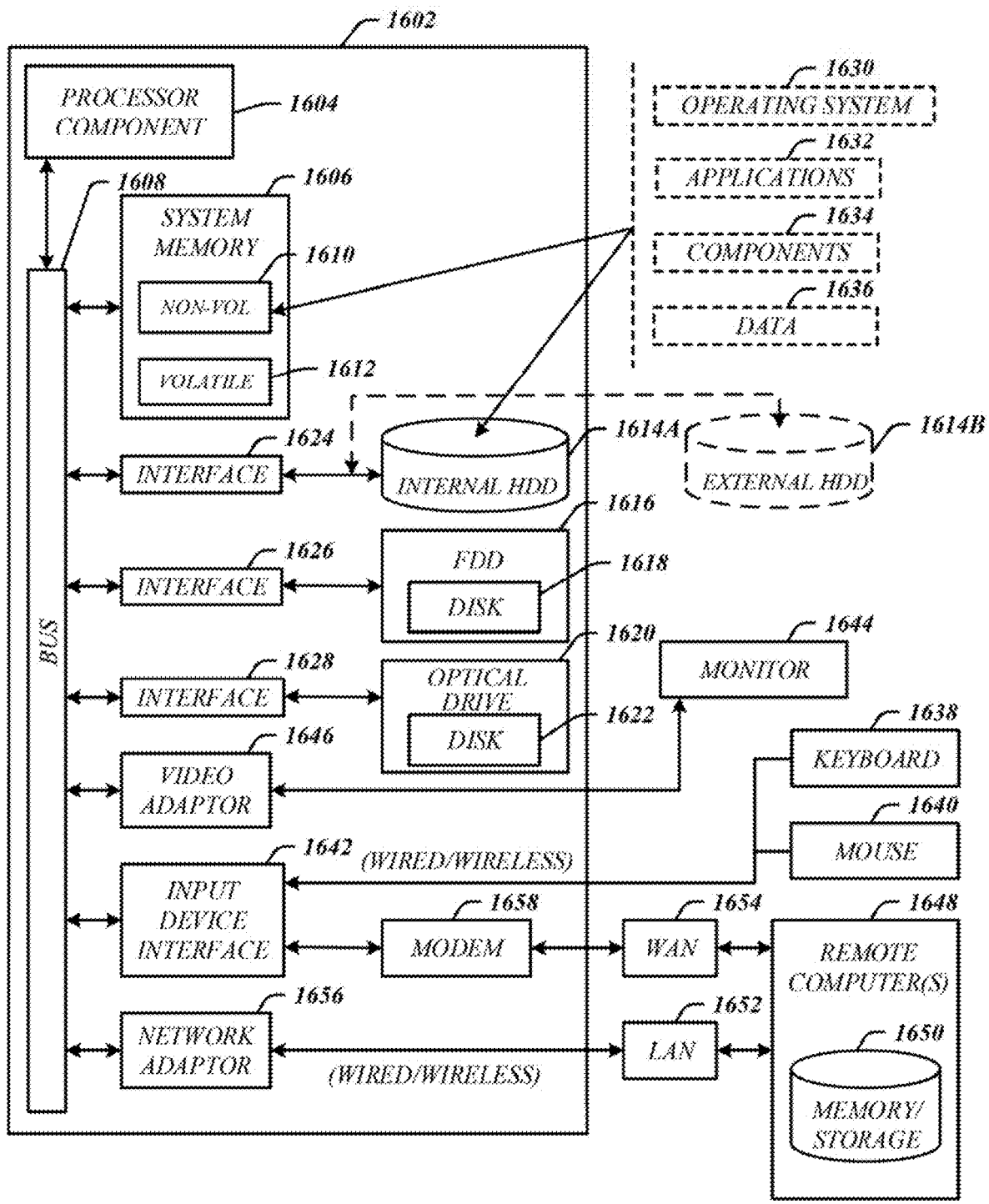
FIG. 16 illustrates an embodiment of a computing architecture.

FIG. 16 illustrates an embodiment of an exemplary computing architecture 1600 suitable for implementing various embodiments as previously described. In one embodiment, the computing architecture 1600 may comprise or be implemented as part of an electronic device. Examples of an electronic device may include those described with reference to FIGS. 1-3, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1600.

As shown in FIG. 16, the computing architecture 1600 comprises a processing component 1604, a system memory 1606 and a system bus 1608. The processing component 1604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing component 1604.

The system bus 1608 provides an interface for system components including, but not limited to, the system memory 1606 to the processing component 1604. The system bus 1608 can be any of several types of bus structure that may further interconnect to a memory bus (with or without a memory controller), a peripheral bus, and a local bus using any of a variety of commercially available bus architectures. Interface adapters may connect to the system bus 1608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 16, the system memory 1606 can include non-volatile memory 1610 and/or volatile memory 1612. A basic input/output system (BIOS) can be stored in the non-volatile memory 1610.

The computer 1602 may include various types of computer-readable storage media in the form of one or more lower speed memory units, including an internal (or external) hard disk drive (HDD) 1614A and 1614B, respectively, a magnetic floppy disk drive (FDD) 1616 to read from or write to a removable magnetic disk 1618, and an optical disk drive 1610 to read from or write to a removable optical disk 1622 (e.g., a CD-ROM or DVD). The HDD 1614, FDD 1616 and optical disk drive 1610 can be connected to the system bus 1608 by a HDD interface 1624, an FDD interface 1626 and an optical drive interface 1628, respectively. The HDD interface 1624 for external drive implementations can include at least one or both of Universal Serial Bus (USB) and IEEE 1694 interface technologies.

The drives and associated computer-readable storage media provide volatile and/or nonvolatile storage of data, data structures, computer-executable instructions, and so forth. For example, a number of program components can be stored in the drives and memory units 1610, 1612, including an operating system 1630, one or more application programs 1632, other program components 1634, and program data 1636. In one embodiment, the one or more application programs 1632, other program components 1634, and program data 1636 can include, for example, the various applications and/or components of the system 100.

An operator can enter commands and information into the computer 1602 through one or more wire/wireless input devices, for example, a keyboard 1638 and a pointing device, such as a mouse 1640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing component 1604 through an input device interface 1642 that is coupled to the system bus 1608, but can be connected by other interfaces such as a parallel port, IEEE 1394 serial port, a game port, a USB port, an IR interface, and so forth.

A monitor 1644 or other type of display device is also connected to the system bus 1608 via an interface, such as a video adaptor 1646. The monitor 1644 may be internal or external to the computer 1602. In addition to the monitor 1644, a computer typically includes other peripheral output devices, such as speakers, printers, and so forth.

The computer 1602 may operate in a networked environment using logical connections via wire and/or wireless communications to one or more remote computers, such as a remote computer 1648. The remote computer 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wire/wireless connectivity to a local area network (LAN) 1652 and/or larger networks, for example, a wide area network (WAN) 1654. Such LAN and WAN networking environments are commonplace in offices and companies, and facilitate enterprise-wide computer networks, such as intranets, all of which may connect to a global communications network, for example, the Internet.

When used in a LAN networking environment, the computer 1602 is connected to the LAN 1652 through a wire and/or wireless communication network interface or adaptor 1656. The adaptor 1656 can facilitate wire and/or wireless communications to the LAN 1652, which may also include a wireless access point disposed thereon for communicating with the wireless functionality of the adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wire and/or wireless device, connects to the system bus 1608 via the input device interface 1642. In a networked environment, program components depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 17:
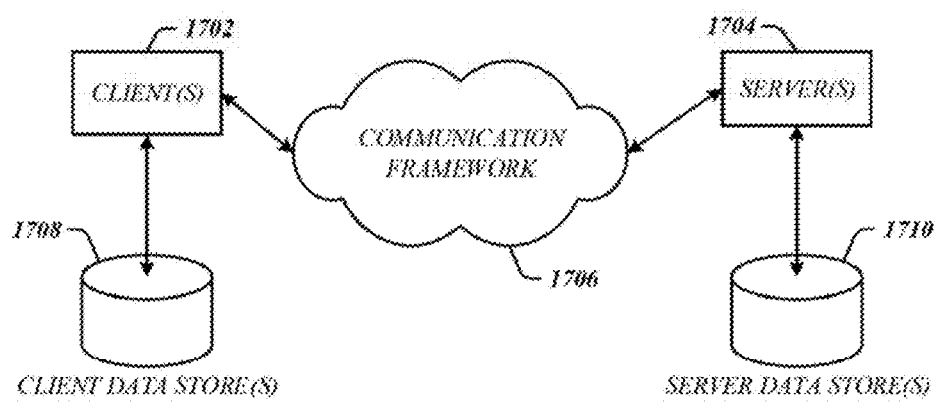
FIG. 17 illustrates an embodiment of a communications architecture.

FIG. 17 illustrates a block diagram of an exemplary communications architecture 1700 suitable for implementing various embodiments as previously described. The communications architecture 1700 includes various common communications elements, such as a transmitter, receiver, transceiver, radio, network interface, baseband processor, antenna, amplifiers, filters, power supplies, and so forth. The embodiments, however, are not limited to implementation by the communications architecture 1700.

As shown in FIG. 17, the communications architecture 1700 comprises includes one or more clients 1702 and servers 1704. The clients 1702 may implement the client devices 110, 200. The servers 1704 may implement any of server devices 120, 130, 310. The clients 1702 and the servers 1704 are operatively connected to one or more respective client data stores 1708 and server data stores 1710 that can be employed to store information local to the respective clients 1702 and servers 1704, such as cookies and/or associated contextual information.

The clients 1702 and the servers 1704 may communicate information between each other using a communication framework 1706. The communications framework 1706 may implement any well-known communications techniques and protocols. The communications framework 1706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1702 and the servers 1704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Embodiments may include a method executed on a computing device, comprising: calculating a selection time period as a function of a time bank allotment for a user profile, a defined time for a selection, and a number of available selections; sending a notification to a client device indicating that the selection time period is initiated at a first time; receiving a selection from the client device at a second time; updating the time bank allotment according to a used time, the used time comprising an amount of time between the first time and the second time; decrementing the number of available selections; and updating the user profile with the received selection.

The method may comprise determining at a third time that no selection has been received, when an amount of time between the first time and the third time equals the selection time period; and automatically making a selection for the user, for example, from a user-ordered set of choices. In some embodiments, the method may include determining a set of available choices for a user selection; retrieving statistical data about the choices in the set; analyzing the set of available choices according to the statistical data; and selecting a best available choice of the available choices.

The method may comprise suspending the selection time period during a non-selection time when no selections may be made; and resuming the selection time period at the end of the non-selection time.

The method may comprise calculating an initial time bank allotment for the user as a function of a number of a plurality of users participating in a turn-based selection process and a total time available to the plurality of users to make selections.

The method may comprise sending a notification to the client device when another user is taking a turn in the turn-based selection process; sending a notification of a number of turns remaining before a next turn of the user; and sending a notification to the client device when the user is next in the turn-based selection process.

The method may comprise receiving a selection from the client device of a number n of choices prior to a start of the turn-based selection process. Then, for each of the first n turns of the user in the turn-based selection process, using a choice of the selected choices as the selection instead of receiving a selection from the user during the turn; decrementing the number of selections of the user remaining to be made by one; and updating a user profile of the user with the choice.

The selection time period may correspond to a draft pick turn in a fantasy game, and the number of selections to be made may correspond to a number of roster positions to be filled in the user's team.

In some embodiments, an apparatus may comprise a processing component; a communications component; and a turn-based application for execution on the processing component. The turn-based application may comprise a time-bank component operative to calculate, for each user profile of a plurality of user profiles, an initial time bank allotment as a function of a number of the plurality of user profiles and a total time available to make selections, to calculate a selection time period for a turn as a function of a time bank allotment for the user profile, a defined time for a selection, and a number of available selections, wherein the start of the selection time period comprises a first time, and to subtract a used time from the time bank allotment for the user profile when a selection is received from a client device at a second time, the used time comprising an amount of time between the first time and the second time.

The turn-based application may further comprise a notification component operative to send a notification via the communications component to the client device indicating that a selection time period is initiated, at the first time. The notification component may be operative to send a notification to the client device when another user is taking a turn in the turn-based selection process, to send a notification of a number of turns remaining before a next turn of the user, and to send a notification to the client device when the user is next in the turn-based selection process.

The turn-based application may further comprise a league management component operative to receive a selection from the client device at the second time and to update a user profile of the individual user with the received selection. The league management component may decrement the number of selections remaining to be made for the individual user when the selection is received. The league management component may determine a turn order for the plurality of users to make selections.

The turn-based application may further comprise a turn component operative to determine at a third time that no selection has been received, when an amount of time between the first time and the third time equals the selection time period; and to automatically make a selection for the user. The turn component may be operative to make the selection from a user-ordered set of choices.

The turn component may be operative to determine a set of available choices for a user selection; retrieve statistical data about the choices in the set; analyze the set of available choices according to the statistical data; and select a best available choice of the available choices.

The turn component may be operative to suspend the selection time period during a non-selection time when no selections may be made; and resume the selection time period at the end of the non-selection time.

The turn component may be operative to receive a selection of a number n of choices prior to a start of the turn-based selection process from a client device of the user; and for each of the first n turns of the user in the turn-based selection process: to use a choice of the selected choices as the selection instead of receiving a selection from the user during the turn; and decrement the number of selections of the user remaining to be made by one.

Embodiments may also include one or more computer-readable storage media comprising instructions that, when executed, cause an apparatus to perform any of the operations described herein.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   calculating a selection time period as a function of a time bank allotment for a user profile, a defined time for a selection, and a number of available selections, wherein the selection time period corresponds to a draft pick turn in a fantasy game, wherein the number of available selections to be made corresponds to a number of roster positions to be filled for a fantasy team associated with the user profile;
   sending a notification to a client device indicating that the selection time period is initiated at a first time;
   receiving a selection from the client device at a second time;
   updating the time bank allotment according to a used time, the used time comprising an amount of time between the first time and the second time; and
   updating the user profile with the received selection and the updated time bank allotment.

2. The method of claim 1, comprising:
   determining at a third time that no selection has been received, when an amount of time between the first time and the third time equals the selection time period; and
   automatically making a selection for the user profile.

3. The method of claim 2, comprising:
   automatically making the selection from a set of choices associated with the user profile.

4. The method of claim 2, comprising:
   determining a set of available choices for a user selection;
   retrieving statistical data about the choices in the set;
   analyzing the set of available choices according to the statistical data; and
   selecting a best available choice of the available choices.

5. The method of claim 1, comprising:
   calculating an initial time bank allotment for the user profile as a function of a number of a plurality of participants in a turn-based selection process and a total time available to the plurality of participants to make selections.

6. The method of claim 5, comprising:
   receiving a selection from the client device of a number n of keeper choices associated with the user profile from a previous round prior to a start of the turn-based selection process;
   for each of the first n turns of the user profile in the turn-based selection process:
      using one of the keeper choices as the selection instead of receiving a selection from the client device during the turn;
      decrementing the number of available selections to be made for the user profile by one; and
      updating the user profile with the keeper choice.

7. An apparatus, comprising:
   a processing component;
   a communications component; and
   a turn-based application for execution on the processing component, comprising:
      a time-bank component operative to:
         calculate, for each user profile of a plurality of user profiles, an initial time bank allotment as a function of a number of the plurality of user profiles and a total time available to make selections, to calculate a selection time period for a turn as a function of a time bank allotment for the user profile, a defined time for a selection, and a number of available selections, wherein the start of the selection time period comprises a first time, and to update the time bank allotment for the user profile according to a used time when a selection is received from a client device at a second time, the used time comprising an amount of time between the first time and the second time; and
      a turn component operative to determine at a third time that no selection has been received, when an amount of time between the first time and the third time equals the selection time period, and to automatically make a selection for the turn.

8. The apparatus of claim 7, the turn-based application further comprising:
   a notification component operative to send a notification via the communications component to the client device indicating that a selection time period is initiated, at the first time.

9. The apparatus of claim 8, the notification component operative to send a notification to the client device when another user is taking a turn in a turn-based selection process, to send a notification of a number of turns remaining before a next turn of the user profile, and to send a notification to the client device indicating that the user profile is next in the turn-based selection process.

10. The apparatus of claim 7, the turn-based application further comprising:
a league management component operative to receive a selection from the client device at the second time and to update the user profile with the received selection and the updated time bank allotment.

11. The apparatus of claim 10, the league management component further to determine a turn order for the plurality of user profiles.

12. The apparatus of claim 7, the turn component operative to suspend the selection time period during a non-selection time when no selections may be made; and
resume the selection time period at the end of the non-selection time.

13. At least one computer-readable storage medium comprising instructions that, when executed, cause an apparatus to:
determine a turn order for a plurality of users in a turn-based selection process;
calculate, at a beginning of a turn for one of the plurality of users, a selection time period as a function of a time bank allotment for a user profile, a defined time for a selection, and a number of available selections, wherein the selection time period corresponds to a draft pick turn in a fantasy game, wherein the number of available selections corresponds to a number of roster positions to be filled for a fantasy team associated with the user profile;
send a notification to a client device indicating that the selection time period is initiated at a first time;
receive a selection from the client device at a second time;
update the time bank allotment according to a used time, the used time comprising an amount of time between the first time and the second time;
decrement the number of available selections; and
update a user profile with the received selection and the updated time bank allotment.

14. The computer-readable storage medium of claim 13, comprising instructions that, when executed, cause the apparatus to:
determine at a third time that no selection has been received, when an amount of time between the first time and the third time equals the selection time period; and
automatically make a selection for the turn.

15. The computer-readable storage medium of claim 14, comprising instructions that, when executed, cause the apparatus to:
automatically make the selection from a set of choices associated with the user profile.

16. The computer-readable storage medium of claim 13, comprising instructions that, when executed, cause the apparatus to:
calculate an initial time bank allotment as a function of a number of the plurality of users and a total time available to the plurality of users to make selections in a round of the turn-based selection process.

17. The computer-readable storage medium of claim 16, comprising instructions that, when executed, cause the apparatus to:
receive a selection from the client device of a number n of keeper choices associated with the user profile prior to a start of the turn-based selection process;
for each of the first n turns of the user profile in the turn-based selection process:
use one of the keeper choices as the selection instead of receiving a selection from the client device during the turn; and
update the user profile with the keeper choice.

18. The computer-readable storage medium of claim 17, wherein the n keeper choices correspond to n selections from the user profile in a previous round of the turn-based selection process.

* * * * *